(12) United States Patent
Süssner et al.

(10) Patent No.: US 8,158,252 B2
(45) Date of Patent: Apr. 17, 2012

(54) STAMPING FILM FOR PRODUCING TAMPER-PROOF MOTOR VEHICLE LICENSE PLATES AND TAMPER-PROOF MOTOR VEHICLE LICENSE PLATE COMPRISING SUCH A STAMPING FILM

(75) Inventors: Hubert Süssner, Oberasbach (DE); Wolfgang Bilger, Siegen (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 925 days.

(21) Appl. No.: 10/599,678

(22) PCT Filed: Mar. 29, 2005

(86) PCT No.: PCT/DE2005/000551
§ 371 (c)(1),
(2), (4) Date: Aug. 5, 2008

(87) PCT Pub. No.: WO2005/100096
PCT Pub. Date: Oct. 27, 2005

(65) Prior Publication Data
US 2008/0286500 A1 Nov. 20, 2008

(30) Foreign Application Priority Data
Apr. 7, 2004 (DE) .......................... 10 2004 017 093

(51) Int. Cl.
*B32B 7/12* (2006.01)
*B32B 15/04* (2006.01)
(52) U.S. Cl. ............ 428/343; 283/72; 283/83; 283/113; 428/13; 428/161; 428/200
(58) Field of Classification Search ............ 283/72, 283/83, 113; 428/13, 161, 200
See application file for complete search history.

(56) References Cited

U.S. PATENT DOCUMENTS

| | | | |
|---|---|---|---|
| 4,629,647 A | 12/1986 | Sander | |
| 4,758,296 A * | 7/1988 | McGrew | 156/231 |
| 4,906,315 A * | 3/1990 | McGrew | 156/231 |
| 5,200,253 A | 4/1993 | Yamaguchi et al. | |
| 5,580,417 A | 12/1996 | Bradshaw | |
| 5,584,962 A | 12/1996 | Bradshaw et al. | |
| 5,665,475 A | 9/1997 | Sussner | |
| 5,815,292 A | 9/1998 | Walters | |
| 6,059,914 A * | 5/2000 | Suss | 156/230 |
| 6,214,443 B1 | 4/2001 | Palmasi et al. | |
| 2001/0013283 A1 | 8/2001 | Pfundstein et al. | |

FOREIGN PATENT DOCUMENTS

| | | |
|---|---|---|
| DE | 3206062 | 8/1982 |
| DE | 3422908 | 1/1986 |
| DE | 4025296 | 2/1991 |
| DE | 3932505 | 4/1991 |
| DE | 4313519 | 10/1994 |
| DE | 4343387 | 6/1995 |
| DE | 4446368 | 6/1996 |
| JP | 2056081 | 2/1990 |
| JP | 3223781 | 10/1991 |
| JP | 8054818 | 2/1996 |
| JP | 2002-542076 | 12/2002 |
| JP | 2003-515182 | 4/2003 |
| JP | 2003150057 | 5/2003 |
| JP | 2003-280498 | 10/2003 |
| RU | 2138082 | 9/1999 |
| WO | WO9209444 | 6/1992 |
| WO | WO 95/32098 | 11/1995 |
| WO | WO9810324 | 3/1998 |
| WO | WO0100345 | 5/2000 |
| WO | WO0063030 | 10/2000 |
| WO | WO 01/03945 | 1/2001 |
| WO | WO0237145 | 5/2002 |
| WO | WO03/027952 | 4/2003 |

OTHER PUBLICATIONS

Japanese Office Action dated Aug. 24, 2010 in Japanese Application No. 2007-506646.

* cited by examiner

*Primary Examiner* — Terressa Boykin
(74) *Attorney, Agent, or Firm* — Hoffmann & Baron, LLP

(57) ABSTRACT

The invention concerns a stamping film for the production of tamper-proof license plates and a license plate produced using a stamping film. The stamping film includes a carrier film and a transfer layer which is detachable from the carrier film and which can be fixed on a substrate of the license plate. Starting from the carrier film, the transfer layer includes a transparent release layer, an opaque decoration layer, a transparent protection layer, an optically variable layer, a reflection layer, a colored layer and an adhesive layer. The decoration layer has mutually spaced areal interruptions where the transparent protection layer adjoins the release layer. The adhesive layer is provided for fixing the transfer layer to the substrate of the license plate.

29 Claims, 2 Drawing Sheets

STAMPING FILM FOR PRODUCING TAMPER-PROOF MOTOR VEHICLE LICENSE PLATES AND TAMPER-PROOF MOTOR VEHICLE LICENSE PLATE COMPRISING SUCH A STAMPING FILM

This application claims priority based on an International Application filed under the Patent Cooperation Treaty, PCT/DE20057000551, filed on Mar. 29, 2005 and German Application No. 102004017093.2-45, filed on Apr. 7, 2004.

The invention concerns a stamping film for producing tamper-proof motor vehicle license plates comprising a carrier film and a transfer layer which is detachable therefrom and which can be fixed on a substrate of the motor vehicle license plate. That stamping film is a hot stamping film or a laminating film.

The invention also concerns a tamper-proof motor vehicle license plate comprising a substrate on which a transfer layer of a stamping film of the above-specified kind is fixed.

DE 43 13 519 C2 to the present applicants discloses a hot stamping film for the production of motor vehicle license plates which comprises a carrier film and a transfer layer which is detachable therefrom. The transfer layer includes—starting from the carrier film—a transparent protection lacquer layer, at least one colored lacquer layer and a particular adhesive layer or an adhesive layer formed by the colored lacquer layer for fixing the transfer layer on a substrate which is to be decorated of the motor vehicle license plate.

It is known for motor vehicle license plates to be produced using hot stamping films, wherein the foundation lacquer layer or the lacquer layer which differs therefrom with the markings on the license plate, for example letters, digits, coats of arms or the like, are produced by means of single-color hot stamping film. License plates of that kind are distinguished in relation to other conventional license plates by great durability and also by virtue of the fact that it is possible to avoid special safety measures during the manufacturing process because operation is not implemented with liquid lacquers.

Having regard to the number of motor vehicle thefts, which is increasing greatly in recent times, and the forged license plates which are used in that case to a great extent, it is desirable to provide a stamping film which makes it possible for the license plates to be provided with particular characters which make forgery more difficult, while in addition the aim should be to provide a possible way of establishing in a simple manner and by means of mechanical devices whether a license plate is a forged license plate or not. For that purpose above-mentioned DE 43 13 519 C2 proposes providing between the protection lacquer layer and the at least one colored lacquer layer, at least in region-wise manner, a decoration lacquer layer representing certain graphic elements, comprising a lacquer containing pigments which luminesce upon being irradiated with UV light. The protection lacquer layer and/or the decoration lacquer layer desirably contains additives acting as a UV absorber. The protection lacquer layer and/or the decoration lacquer layer of that known hot stamping film preferably contains HALS stabilizers ("hindered amine light stabilizer(s)"). In the case of that known stamping film the decoration lacquer layer is preferably applied in a printing process.

WO 00/63030 discloses a method and an apparatus for printing road signs. That known method includes the following method steps: reading in an original in digital form of a traffic sign to be produced by means of a reading-in device and transferring the original to a printer, printing on a hot stamping film with the read-in original by means of the printer—preferably in mirror image-reversed relationship—on the surface of the hot stamping film which is coated with hot adhesive, feeding the printed hot stamping film to a laminating apparatus by means of a film guide and hot-laminating the printed hot stamping film onto a reflection film which is preferably applied by lamination to the front side of a substrate, that is to say a traffic sign blank, by means of the laminating apparatus, wherein the hot laminating step is preferably effected by means of hot stamping punches or by means of hot stamping rollers in point form or over an area. The operation of printing the original on the hot stamping film can be effected by means of a thermotransfer process, an electrostatic printing process or an inkjet printing process in color and/or black/white.

The apparatus for printing road signs in above-specified WO 00/63030 includes the following components: a printer which is suitable for printing on a hot stamping film—in particular on the surface thereof which is coated with hot adhesive—, a reading-in apparatus which is connected to the printer and which is suitable for reading in an original of a road sign to be produced, wherein the original is preferably in digital form, a laminating apparatus which is provided for hot lamination in areal or point form of the printed hot stamping film onto a reflection film which is preferably applied by lamination to a road sign blank—in particular by means of a hot stamping punch or by means of a hot stamping roller—, a film guide which feeds the printed hot stamping film to the laminating apparatus. The printer and the reading-in apparatus are appropriately connected to a computer-aided design station which is capable of producing originals for road signs by means of a suitable control program. The printer can be a thermotransfer printer, an electrostatically operating printer such as a laser printer or an inkjet printer.

SUMMARY OF THE INVENTION

The object of the invention is to provide a stamping film of the kind set forth in the opening part of this specification, with which it is possible further to improve the tamperproofness of motor vehicle license plates and to be able to comparatively easily produce a correspondingly tamper-proof motor vehicle license plate.

In accordance with the invention in regard to the stamping film that object is attained in that the transfer layer—starting from the carrier film—has a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate. That object is further attained by a tamper-proof motor vehicle license plate comprising a substrate on which a transfer layer of a stamping film is fixed, wherein the transfer layer has a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate.

In accordance with a preferred embodiment of the invention a colored layer which is preferably of an opaque nature is arranged between the reflection layer and the adhesive layer. The additional colored layer enhances the contrast of optical effects produced by the optically variable layer, improves the opacity of the graphic configurations shaped on the license plate by means of the stamping film and protects the reflection layer form the influences of the weather. Preferably in that respect a bonding layer is provided between the reflection layer and the colored layer in order to guarantee a long service life for the characters on the motor vehicle license plate even under extreme weather conditions.

With the stamping film according to the invention it is also possible for the colored layer to have adhesive properties so that it is possible to dispense with a specific adhesive layer.

In the stamping film according to the invention the a real interruptions in the opaque decoration layer can have a peripheral edge of a graphic configuration. The areal interruptions can reproduce for example a coat of arms, an article of the flora such as a palm or a tree, an article of the fauna such as an insect, an animal or the like. That provides an additional security feature which is perceptible to the viewer and which further improves the tamperproofness of the motor vehicle license plate.

The areal interruptions of the opaque decoration layer are of relatively small area dimensions. Those small area dimensions can be for example 20% of the opaque decoration layer. Such small area dimensions provide that the proportion of light which is diffracted or reflected by the stamping film does not result in the recognizability of the motor vehicle license plate being adversely affected. Particularly when being viewed from a relatively great distance, the motor vehicle license plate still remains recognizable equally well, but now it additionally has a further security feature which can be checked visually rapidly and with little effort.

In accordance with the invention the optically variable layer can be a replication layer with a diffractive relief structure. The diffractive relief structure can form a 2D or 3D hologram. A stamping film according to the invention which is designed in that fashion has optimum properties in regard to tamperproofness. A motor vehicle license plate produced which such a stamping film is consequently correspondingly tamper-proof.

It will be appreciated that it is also possible for another diffractive surface structure to be shaped into the replication layer, which surface structure for example produces different images from different viewing angles.

It is particularly advantageous in that respect for the diffractive relief structure used to be a relief structure which diffracts incident light directed in one or more directions. Relief structures of that kind can be formed for example by diffractive relief structures with an asymmetrical, for example triangular relief profile or by binary zero-order diffraction structures with corresponding properties. Suitable binary zero-order diffraction structures are described for example in WO 02/037145 A3. Diffractive relief structures of that kind are now so adapted that they diffract the incident light in one or more directions from specular reflection so that, when viewed in specular reflection mode, none of the diffracted light or only a small part thereof is visible. The optically variable effect generated by the diffractive relief structure is accordingly not recognizable or is only poorly recognizable in the specular reflection mode so that the recognizability of the motor vehicle license plate is not adversely affected by the diffractive relief structure, even when the areal interruptions occupy a relatively large proportion of the surface area. Under diffuse lighting the optical effect generated by the diffractive relief structure still remains clearly recognizable whereas in the case of directional lighting, for example in the case of a flash photograph, the opaque appearance of the stamping film is not adversely affected.

In the case of the stamping film according to the invention the optically variable layer may also have a macrostructure whose dimensions are $\geq 0.4$ mm and whose extreme value spacing is $\geq 0.1$ mm. A stamping film according to the invention of such a configuration provides an inexpensive security element having a novel optical effect, which forms a thin layer composite. The macrostructure is preferably an at least portion-wise steady and differentiatable function of the co-ordinates (x, y), curved at least in partial regions, and not a periodic triangular or rectangular function. In that case there can be at least two adjacent surface elements, wherein one macrostructure is formed in the one surface portion and another macrostructure is formed in the other surface portion, wherein the gradients of the two macrostructures can be oriented in substantially parallel planes which contain a normal to the reference plane. The macrostructure can be for example a periodic function with a spatial frequency of a maximum of 5 lines/mm. Likewise it is possible for the macrostructure to be a portion-wise steady and differentiable function of a surface structure of a relief image. A submicroscopic diffraction grating with a relief profile can be additively superimposed on the macrostructure, in which case the relief profile has a spatial frequency of preferably $\geq 2400$ lines/mm and a constant profile depth of $\leq 5$ μm and the diffraction grating following the macrostructure retains the predetermined relief profile.

A light-scattering matt structure with a relief profile can also be additively superimposed on the macrostructure, in which case the matt structure has a mean roughness value in the range of between 200 nm and 5 μm and the matt structure following the macrostructure retains the predetermined relief profile.

In that respect however it is also possible for the macrostructure used to be an asymmetrical macrostructure which reflects incident light directed in one or more directions from specular reflection. Macrostructures of that kind can be formed for example by a periodic triangular function or by another portion-wise steady differentiable function which as far as possible has no area components in the plane defined by the stamping film. Equally the use of anisotropic matt structures affords advantages which also provide for such directed scatter of the incident light. Structures of that kind achieve the advantages which have already been set forth above, that the recognizability of the motor vehicle license plate is not adversely affected by the optically variable layer.

In the stamping film according to the invention the optically variable layer can further also have a nanotext which is recognizable only when viewed through a suitable auxiliary means (magnification instrument). The nanotext can be generated for example by the combination of a matt structure with an asymmetrical achromatic structure (see above), by either the pattern surface or the background surface of the nanotext being backed with one structure or the other. In that respect the dimensions of the individual characters of the nanotext are in a range below the resolution capability of the human eye so that, to the naked eye of the viewer, in the region of the nanotext, the surface has a gray value which depends on the ratio of the surface proportions of the two structures. In that case such a nanotext can be composed of individual numbers and letters and any graphic symbols, for example coats of arms or pictograms. In that case the pattern and the background surface are respectively backed by different structures, for example a mirror structure, a matt structure, a diffractive structure, a thin-film structure or two different diffractive or thin-film structures.

In accordance with a further preferred embodiment of the invention the optically variable layer has a pattern with first and second partial surfaces, wherein the first partial surfaces form background surfaces in the pattern and the second partial surfaces form pattern elements in the pattern. The first partial surfaces have mirror surfaces reflecting the incident light or relief structures which directionally diffract the incident light, as described above. The second partial surfaces have relief structures of a predetermined optically effective structural depth which are adapted as absorber surfaces for the incident light. Such a configuration in respect of the surface structure of the optically variable layer provides that, in a given direction, the bright light which is diffracted or reflected at the first partial surfaces is present as a background surface in relation to the dark, light-absorbing pattern elements, and in other directions the intensity per unit of surface area of the light which is scattered in the background surface and in the pattern elements are approximately of equal magnitude so that there is no contrast between the background surface and the pattern elements. The pattern accordingly can be recognized only at one or more given viewing angles whereas at all other viewing angles the pattern cannot be recognized or can be recognized only with difficulty and the optically variable layer acts substantially to absorb light. At all those further viewing angles therefore the stamping film has substantially light-absorbing properties so that, at those viewing angles, even when the interruptions of the opaque cover layer are of a large area, the arrangement guarantees very good recognizably of the letters shaped on the motor vehicle license plate by means of the stamping film. A high degree of tamperproofness is accordingly achieved without the identification function of the motor vehicle license plate being impaired in any way.

It is possible in that respect for the first partial surfaces to be shaped in the form of flat mirror surfaces so that the pattern in reflected light has the intensive light mirror surfaces of the background surfaces and the dark absorbent pattern elements, and in directions other than that of the reflected light, the intensity per unit of surface area of the light which is scattered in the background surfaces and in the pattern elements are equally great so that there is no contrast between the background surfaces and the pattern elements. In addition it is also possible for the first partial surfaces to be in the form of mirror surfaces which are inclined in one or more directions with respect to the plane defined by the stamping film and for directionally diffracting structures to be provided in the first partial surfaces. That provides that, in the direction of the light which is reflected at the plane, the intensity of the light scattered in the background surfaces and the light scattered in the pattern elements is of equal magnitude so that there is no contrast between the background surfaces and the pattern elements and, in one or more other directions, the intensive light mirror surfaces of the background surfaces and the dark light-absorbent pattern elements are visible.

In an angular range around specular reflection, which range is determined by the choice of the structures in the first partial surfaces, the optically variable layer accordingly acts as an opaque, light-absorbent element and has a marked pattern outside that angular range.

The relief structures of the second partial surfaces preferably comprise a cross-grating which is composed of two base gratings which are arranged substantially in right-angled relationship with each other, with the periods ($d_x$, $d_y$). The periods ($d_x$, $d_y$) can be shorter than a predetermined limit wavelength of the visible light. It is desirable in that respect if at least one of the periods ($d_x$, $d_y$) is longer than half the limit wavelength but shorter than the limit wavelength. The limit wavelength is desirably selected to be in the range of between 380 nm and 420 nm. The optically effective structural depth of the relief structure in one of the pattern elements can be between 50 nm and 500 nm.

In accordance with the invention another possibility provides that the optically variable layer is a thin-film element for producing color changes by interference.

A thin-film element of that kind is preferably formed from an absorption layer and a spacer layer which satisfies the $\lambda/4$ condition. It is however also possible for a thin-film element of that kind to be made up of a plurality of high-refractive and low-refractive layers. The use of a thin-film element affords a high degree of tamperproofness as elements of that kind can only be manufactured with a high level of technological complication and expenditure and the color change represents an easily recognizable security element from the point of view of the viewer.

In addition it is also possible for the optically variable layer to have at least one polarization layer so that the tamper-proof motor vehicle license plate has a concealed security element which can be recognized by means of an analyzer.

It will be appreciated that it is also possible for one or more of the above-described security features to be combined together in a stamping film according to the invention or in a tamper-proof motor vehicle license plate according to the invention, and for the optically variable layer thus to have for example both a diffractive relief structure and also a plurality of thin-film layers and a polarization layer.

In the stamping film according to the invention the reflection layer can be a metal thin layer. According to the invention it is also possible for the reflection layer to comprise a metal thin layer and at least one layer of an inorganic dielectric. The stated inorganic dielectric can be for example ZnS.

The release layer and/or the decoration layer and/or the protection layer and/or the colored layer of the stamping film according to the invention desirably contains UV absorber and/or HALS stabilizer additives in order to improve the UV resistance of the stamping film and thus the tamper-proof motor vehicle license plate according to the invention which is produced with the stamping film according to the invention.

The decoration layer and/or the colored layer preferably contain amorphous carbon.

BRIEF DESCRIPTION OF THE DRAWINGS

Further details, features and advantages will be apparent from the description hereinafter of embodiments by way of example of the stamping film according to the invention, of which portions are diagrammatically shown in the drawings on a greatly enlarged scale—not true to scale—.

DETAILED DECRIPTION OF THE INVENTION

Figure 1:
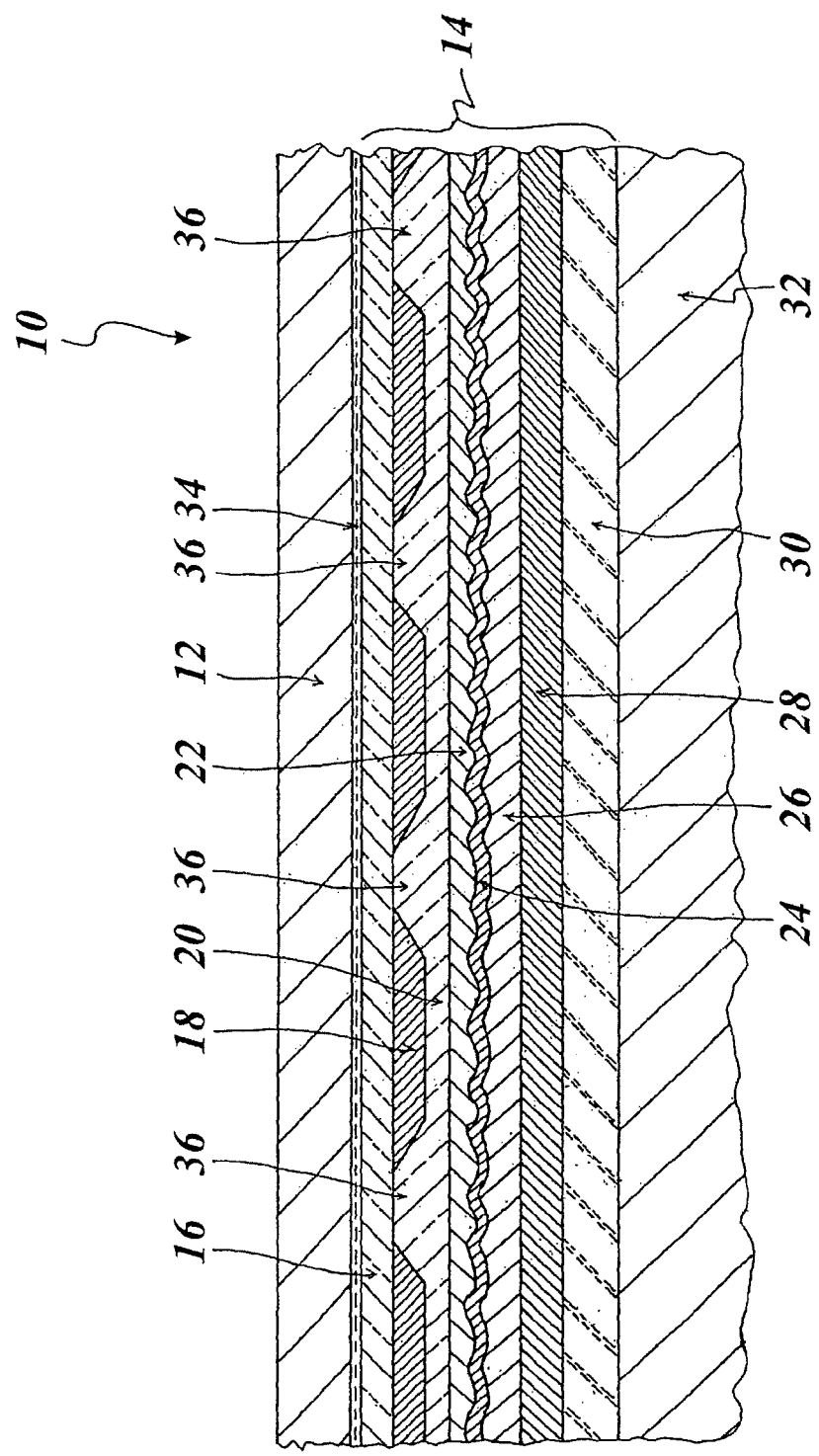
FIG. 1 shows a sectional view of a stamping film according to the invention.

FIG. 1 is a greatly enlarged diagrammatic view in section, not true to scale, illustrating an embodiment of the stamping film 10 which is provided for producing tamper-proof motor vehicle license plates and which is formed from a carrier film 12 and a transfer layer 14 which is detachable therefrom. The transfer layer 14 is releasable from the carrier film 12 and can be fixed on a substrate of a motor vehicle license plate. That substrate is for example a sheet metal carrier provided with a retroreflective coating.

The transfer layer 14—starting from the carrier film 12—has a transparent release layer 16, an opaque decoration layer 18, a transparent protection layer 20, an optically variable layer 22, a reflection layer 24, a bonding layer 26, a colored layer 23 and an adhesive layer 30. The transfer layer 14 can be fixed on a substrate 32 of a motor vehicle license plate by means of the adhesive layer 30. A separation layer 34 is provided between the transfer layer 14 and the carrier film 12 to release the transfer layer 14 from the carrier film 12.

The opaque decoration layer 18 has mutually spaced areal interruptions 36 at which the transparent protection layer 20 adjoins the release layer 16. The optically variable layer 22 is visible through those areal interruptions 38 when the transfer layer 14 is removed from the carrier film 12 and fixed on the substrate 32.

The carrier film 12 comprises a plastic material film of a thickness of between 4 and 75 μm. Preferably the carrier film comprises a PET film of a thickness of about 23 μm. The separation layer 34 for example of a thickness of between 0.01 μm and 0.5 μm is now applied to the carrier film. The separation layer 34 is preferably a wax-like layer which in the application operation, in particular in the hot stamping operation, due to the rise in temperature, permits the transfer layer to be easily detached from the carrier film.

The layers of the transfer layer 14 are of the following composition:

The release layer 16—like the separation layer 34—on the one hand assists with easy detachment of the carrier film 12 from the transfer layer 14 in the application procedure, in particular in the (hot) stamping procedure. The release layer 16 has a surface nature which permits easy detachment of the carrier film from the transfer layer in the application procedure. In addition the release layer affords a protection function for the subjacent film body, and accordingly also performs the function of a protection layer. In particular the release layer 16 which is applied to the separation layer 34 over the full area involved in a thickness of between 0.5 and 3 μm protects the transitions of the partial opaque decoration layer 18 and the protection layer 20 in the region of the interruptions 36 from weather influences.

Preferably in that respect the release layer 16 of the following composition is applied to the separation layer 34 over the full surface area involved in a layer thickness after drying of 1.15 μm;

| Release layer (16): | |
|---|---|
| Methyl ethyl ketone | 50.00% |
| Toluene | 29.00% |
| Thermoplastic acrylate (d = about 1.18 g/ccm, Tg about 121° C.) | 18.50% |
| HALS stabilizer (tetramethyl piperidine derivative) | 0.50% |
| UV absorber (benzotriazol derivative, density about 1.17 g/ccm) | 1.00% |
| Dibutyl tin dilaurate | 1.00% |

The decoration layer 18 is then applied in pattern form to the full-area release layer 16 by means of a printing process, thus resulting in the pattern-form interruptions 36 indicated in the Figure. In that respect, as already described hereinbefore, the interruptions 36 are in the form of numbers, coats of arms and the like and preferably cover a proportion of surface area of between 5 and 20% of the release layer 16. It is however also possible for the interruptions to involve a large proportion of surface area, for example 99%. As already mentioned hereinbefore the optimum proportion of surface area of the interruptions 36 in that respect is determined both by the graphic configuration of the interruptions 36 and also by the nature and the properties of the subjacent optically variable layer 22.

The decoration layer 18 forms an opaque layer of a preferred thickness of between 1.0 and 3 μm. In that case the decoration layer 18 is preferably colored black but it can also be colored in any other color, for example a red color.

By way of example the decoration layer 18 is applied in pattern form to the release layer 16 in a thickness of 1.5 μm, of the following composition:

| Decoration layer (18): | |
|---|---|
| Methyl ethyl ketone | 55.00% |
| Cyclohexanone | 10.00% |
| Diacetone alcohol | 8.00% |
| Thermoplastic acrylate (d = about 1.13 g/ccm, Tg about 82° C.) | 15.00% |
| Vinyl chloride-vinyl alcohol-vinyl acetate copolymer (d = about 1.39 g/ccm, Tg about 89° C.) | 4.20% |
| HALS stabilizer (tetramethyl piperidine derivative) | 0.01% |
| UV absorber (benzotriazol derivative, density about 1.17 g/ccm) | 0.04% |
| Carbon, amorphous (Pigment Black 7) | 7.75% |

The protection layer 20 is then applied over the full surface area to the film body consisting of the release layer 16 and the decoration layer 18, more specifically in such a way that the interruptions 36 are preferably completely filled up. The protection layer 20 is in that case preferably applied to the decoration layer 18 in a thickness of between 0.5 and 5 μm over the full area by means of a printing process. In that case the protection layer 20 protects the subjacent optically variable layer from weather influences. It is transparent so that the optically variable effect produced by the subjacent optically variable layer is visible. In that case the protection layer 20 can also be colored as long as it remains substantially transparent.

The protection layer 20 is thus applied to the opaque decoration layer 18, in a thickness of 2.5 μm, of the following composition:

| Protection layer (20): | |
|---|---|
| Methyl ethyl ketone | 36.20% |
| Toluene | 13.00% |
| Butyl acetate | 10.50% |
| Cellulose nitrate (low viscosity, d = about 1.00 g/ccm, Ac = about 65%) | 9.80% |
| HALS stabilizer (tetramethyl piperidine derivative) | 0.50% |
| UV absorber (benzotriazol derivative, density about 1.17 g/ccm) | 1.00% |
| Melamine formaldehyde resin (d = about 0.98 g/ccm) | 13.00% |
| Hydroxyacryl resin (d = about 1.01 g/ccm, OH content about 4.5%) | 15.00% |
| Paratoluolsulfonic acid | 1.00% |

The optically variable layer 22 is then applied to the protection layer 20.

In accordance with a preferred embodiment of the invention the optically variable layer 22 comprises a replication layer in which a surface structure is replicated. In this embodiment the layer 22 comprises a replication lacquer layer, for example of a thermoplastic material or a UV replication lacquer. That replication lacquer layer is applied to the protection layer 20 for example by means of a screen printing roller in a layer thickness of between 0.1 and 1.5 μm, dried and then processed by means of a replication tool.

Thus for example a replication lacquer layer of a thickness of 0.8 μm of the following composition is applied to the protection layer 20:

| Optically variable layer (22): | |
|---|---|
| Ethyl acetate | 44.70% |
| Cyclohexanone | 44.70% |
| Polymethylmethacrylate (d = about 1.19 g/ccm, Tg = about 122° C.) | 6.10% |
| Cellulose compound (d = about 1.20 g/ccm, softening range: 140-240° C.) | 4.50% |

Then a surface structure is embossed into the replication lacquer layer by means of an embossing tool under the influence of temperature and pressure.

UV replication in which cross-linking of the replication lacquer layer is effected by means of UV radiation is also possible.

Figure 2A:
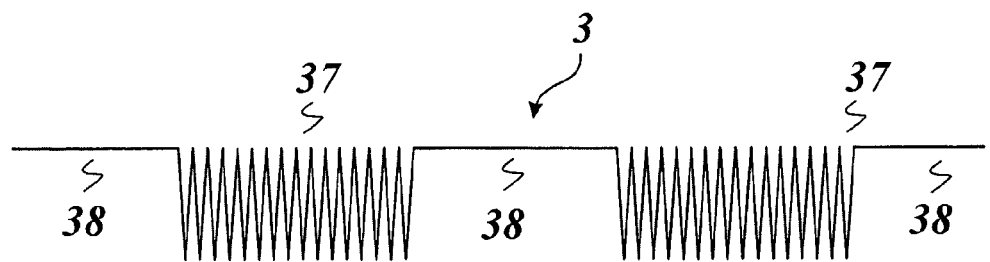
FIG. 2a shows a diagrammatic view of a relief structure for the stamping film of FIG. 1 for a first embodiment of the invention.
Figure 2B:
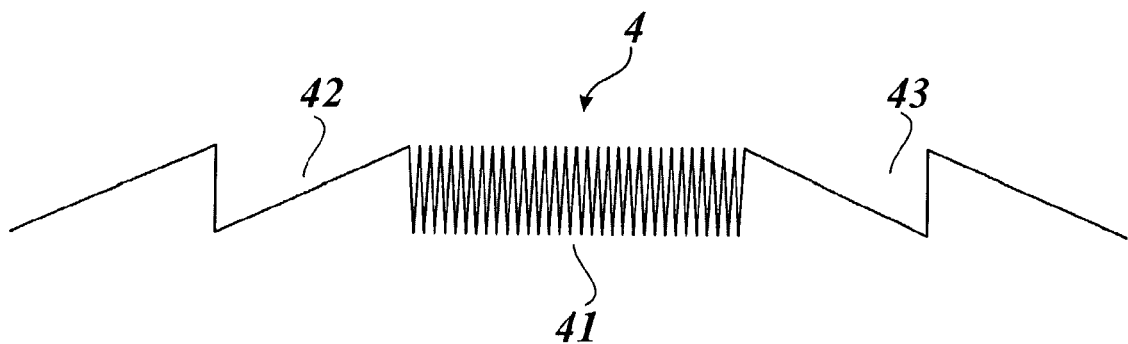
FIG. 2b shows a diagrammatic view of a relief structure for the stamping film of FIG. 1 for a further embodiment of the invention.

Both diffractive surface structures, for example a 2D/3D hologram, a macrostructure or a matt structure can be shaped into the replication lacquer layer, as the surface structure. In accordance with a preferred embodiment of the invention in that case one of the following relief structures which are described with reference to FIGS. 2a through 2c is shaped into the replication lacquer layer:

FIG. 2a shows a surface structure 3 which has first partial surfaces 38 and second partial surfaces 37. A pattern acting as a security feature is now composed of first partial surfaces 38 and second partial surfaces 37, wherein the first partial surfaces 38 form background surfaces and the second partial surfaces 37 form pattern elements. As shown in FIG. 2a the relief structure 3 has a respective flat mirror surface reflecting the incident light, in each of the first partial surfaces 38. A special relief structure which is provided as an absorber surface for the incident light is shaped in the second partial surfaces 37. The possible construction of such a relief structure for absorbing the incident light is described hereinafter by way of example with reference to FIG. 2c.

Figure 2C:
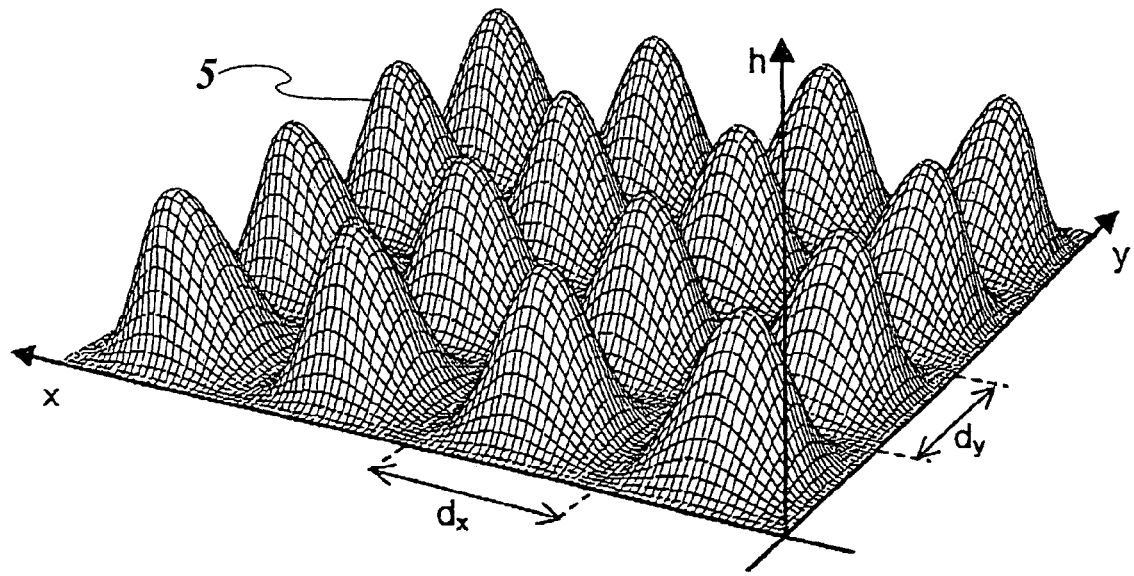
FIG. 2c shows a detail view of a partial relief structure used in the relief structures shown in FIGS. 2a and 2b.

FIG. 2c shows a relief structure 5 which is formed by a cross-grating which is composed of two base gratings with periods of less than a limit wavelength λ at the short-wave end in the spectrum of visible light, that is to say λ=318 nm through λ=420 nm. The relief structure 5 has an optically effective structural depth, namely the profile depth multiplied by the refractive index of the replication lacquer layer, preferably in the range of between h=50 nm and h=500 nm. Such relief structures absorb almost all visible light which is incident on the second partial surfaces 37 and scatter a small fraction of the incident light back into the half-space above the second partial surfaces 37. The percentage of the absorbed light is non-linearly dependent on the structural depth h and can be scattered at between 50% and about 99% by means of the selection of the structural depth h in the above-specified range. In this respect, the shallower the relief structure 5 is, the correspondingly more incident light is scattered back and accordingly correspondingly less light is absorbed. The configuration of the relief structure 5 shown in FIG. 2c is formed by a cross-grating formed from two mutually crossing sinusoidal base gratings. The sine function of the first base grating, which extends along the co-ordinate x, is of a period $d_x$ and an amplitude $h_x$, while the sine function of the second base grating, which extends along the co-ordinate y, is of a period $d_y$ and an amplitude $h_y$. Over the plane defined by the co-ordinates x and y the boundary surface h (of x, y) formed by the cross-grating follows for example the function:

$$h(x,x)=[h_x+h_y]\cdot\sin^2(\pi x/d_x)\cdot\sin^2(\pi y/d_y)$$

In other embodiments it is also possible to use rectangular or pyramidal structures as functions for the base gratings.

The light which is incident on the relief structure 3 is reflected at the first partial surfaces 38 which are shaped in the form of flat mirror surfaces, in accordance with the plane defined by the stamping film, so that in the specular reflection mode the intensively light mirror surfaces of the first partial surfaces 38 are visible against the background of the dark, light-absorbing second partial surfaces 37. In the directions other than that of the reflected light, the intensity per unit of surface area of the light scattered at the first partial surfaces 38 and that of the light scattered into the half-space over the second partial surfaces 37 are equal so that no contrast between the first and second partial surfaces 38 and 37 is visible.

The relief structure 4 shown in FIG. 2b has first partial surfaces 42 and 43 and second partial surfaces 41. The second partial surfaces 41 are shaped in accordance with the relief structure 5 and thus absorb the incident light. The partial surfaces 42 have mirror surfaces which are somewhat inclined with respect to the plane defined by the stamping film so that they reflect towards the left, light which is incident perpendicularly to the plane. The partial surfaces 43 have mirror surfaces which are inclined with respect to the plane defined by the stamping film in such a way that they reflect towards the right light which is incident perpendicularly to that plane. Accordingly, in the direction of specular reflection of the plane defined by the stamping film, the intensity of the light scattered at the partial surfaces 42 and 43 is equal to the intensity of the light scattered into the half-space over the partial surfaces 41. Accordingly, in that direction, there is no contrast between the first and second partial surfaces, and no pattern is visible. In the directions away from that specular reflection, such directions being determined by the inclination of the partial surfaces 42, the intensive light mirror surfaces of the partial surfaces 42 and 43 respectively are visible against the dark, light-absorbing partial surfaces 41 so that the pattern is clearly recognizable.

It is further possible to use a thin-film layer element as the optically variable layer. A thin-film layer element of that kind comprises an adsorption layer (preferably with between 30 and 60% transmission) and a transparent spacer layer as a color change-producing layer (λ/4 layer). It is further possible to construct a thin-film element from a succession of high-refractive and low-refractive layers. For example the thin-film element can be made up from between three and nine such layers (odd number of thin-film layers) or between two and ten such layers (even number of thin-film layers). The greater the number of layers, the correspondingly sharper is it possible to set the wavelength for the color change effect.

Examples of usual layer thicknesses for the individual layers of a thin-film element and examples of materials which in principle can be used for the layers of such a thin-film element are disclosed for example in WO 01/0345, page 5, line 30 through page 8, line 5.

In addition it is also possible to use a polarization layer as the optically variable layer. A polarization layer of that kind is constructed for example from a layer of oriented and cross-linked liquid crystal material.

It will be appreciated that it is also possible for the optically variable layer 22 to be constructed from a combination of the layers listed hereinbefore for the optically variable layer 22.

The reflection layer 24 is then applied over the full surface area to the optically variable layer 22. Preferably the reflection layer 24 comprises a thin vapor-deposited metal layer. Materials that are considered for that metal layer are essentially chromium, aluminum, copper, iron, nickel, silver, gold or an alloy with those materials. In addition it is also possible for the reflection layer 24 to comprise a thin dielectric layer of an HRI-material or an LRI-material (HRI=high refraction index; LRI=low refraction index). A bonding layer 26 is then preferably applied in a thickness of between 0.1 and 1.0 μm to the reflection layer 24. Thus for example, as the bonding layer, it is possible to apply a layer of the following composition, of a thickness of 0.2 μm, to the reflection layer 24:

| Bonding layer (26): | |
|---|---|
| Methyl ethyl ketone | 35.00% |
| Toluene | 45.00% |
| Ethanol | 15.00% |
| Vinyl chloride-vinyl acetate copolymer (d = about 1.21 g/ccm) | 4.90% |
| Dibutyl tin dilaurate | 0.10% |

The colored layer 28 is then applied over the full surface area, preferably in a thickness of between 1 and 5 μm. In that case the colored layer 28 is preferably colored in the same manner as the decoration layer 18, for example by means of a black pigment. Thus for example a colored layer is applied in a thickness of 2 μm, of the following composition, to the bonding layer 26:

| Colored layer (28): | |
|---|---|
| Methyl ethyl ketone | 66.00% |
| Thermoplastic acrylate (d = about 1.13 g/ccm, Tg about 82° C.) | 17.50% |
| HALS stabilizer (tetramethyl piperidine derivative) | 0.10% |
| UV absorber (benzotriazol derivative, density about 1.17 g/ccm) | 0.40% |
| High-molecular polyurethane resin (d = about 0.96 g/ccm) | 1.50% |
| Carbon, amorphous (Pigment Black 7) | 14.50% |

The adhesive layer 30 is then applied in a thickness of between 0.5 and 5 μm to the colored layer 28. The adhesive layer 30 is preferably an adhesive layer comprising a thermally activatable adhesive.

What is claimed is:

1. A stamping film, for producing tamper-proof motor vehicle license plates, the stamping film comprising:
    a carrier film and
    a transfer layer which is detachable from the carrier film for fixing the transfer film on a substrate of a motor vehicle license plate, wherein starting from the carrier film the transfer layer includes, in successive order, a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate, the optically variable layer being visible through the areal interruptions when the transfer layer is removed from the carrier film and fixed on the substrate of the motor vehicle.

2. A stamping film for producing tamper-proof motor vehicle license plates, the stamping film comprising:
    a carrier film; and
    a transfer layer which is detachable from the carrier film for fixing the transfer film on a substrate of a motor vehicle license plate, wherein starting from the carrier film the transfer layer includes a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate, wherein the areal interruptions of the decoration layer have a peripheral edge of a graphic configuration.

3. A stamping film for producing tamper-proof motor vehicle license plates, the stamping film comprising:
    a carrier film; and
    a transfer layer which is detachable from the carrier film for fixing the transfer film on a substrate of a motor vehicle license plate, wherein starting from the carrier film the transfer layer includes a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate, wherein the areal interruptions of the decoration layer are of small area dimensions which occupy a proportion of surface area of less than 20%.

4. A stamping film according to claim 1 wherein a colored layer is arranged between the reflection layer and the adhesive layer.

5. A stamping film according to claim 4 wherein a bonding layer is provided between the reflection layer and the colored layer.

6. A stamping film for producing tamper-proof motor vehicle license plates, the stamping film comprising:
    a carrier film; and
    a transfer layer which is detachable from the carrier film and which can be fixed on a substrate of a motor vehicle license plate, wherein starting from the carrier film the transfer layer includes, in successive order, a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate, wherein the optically variable layer is a replication layer with a diffractive relief structure, wherein the diffractive relief structure is a relief structure which diffracts the incident light directed in one or more directions from specular reflection.

7. A stamping film according to claim 6 wherein the diffractive relief structure forms a hologram.

8. A stamping film for producing tamper-proof motor vehicle license plates, the stamping film comprising:
a carrier film; and
a transfer layer which is detachable from the carrier film for fixing the transfer film on a substrate of a motor vehicle license plate, wherein starting from the carrier film the transfer layer includes a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate, wherein the optically variable layer includes at least one of a macrostructure the dimensions of which are $\geq 0.4$ mm and the extreme value spacing of which is $\geq 0.1$ mm, a matt structure and nanotext.

9. A stamping film for producing tamper-proof motor vehicle license plates, the stamping film comprising:
a carrier film; and
a transfer layer which is detachable from the carrier film for fixing the transfer film on a substrate of a motor vehicle license plate, wherein starting from the carrier film the transfer layer includes a transparent release layer, an opaque decoration layer, a transparent protection layer, an optically variable layer, a reflection layer and an adhesive layer, wherein the decoration layer has mutually spaced areal interruptions at which the transparent protection layer adjoins the release layer and wherein the adhesive layer is provided for fixing the transfer layer to the substrate of the motor vehicle license plate, wherein the optically variable layer has a pattern with first and second partial surfaces, wherein the first partial surfaces form background surfaces in the pattern and the second partial surfaces form pattern elements in the pattern, wherein the first partial surfaces have mirror surfaces reflecting the incident light or relief structures for directly diffracting the incident light and the second partial surfaces have relief structures of a predetermined optically effective structural depth which include absorber surfaces for the incident light so that in a given direction the light which is diffracted or reflected at the first partial surfaces is present as a background surface in relation to dark, light-absorbing pattern elements, and in other directions the intensities per unit of surface area of the light scattered in the background surfaces and in the pattern elements are equal so that the contrast between the background surfaces and the pattern elements is markedly reduced or extinguished.

10. A stamping film according to claim 9 wherein the first partial surfaces are flat mirror surfaces so that the pattern in the reflected light has the intensively light mirror surfaces of the background surfaces and the dark, light-absorbing pattern elements and in directions other than that of the reflected light the intensities per unit of surface area of the light scattered in the background surfaces and in the pattern elements are equal so that there is no contrast between the background surfaces and the pattern elements.

11. A stamping film according to claim 10 wherein the first partial surfaces are mirror surfaces which are inclined in one or more directions with respect to the plane defined by the stamping film so that in the direction of the light reflected at the plane the intensities of the light scattered in the background surfaces and of the light scattered in the pattern elements are equal so that there is no contrast between the background surfaces and the pattern elements and in one or more other directions there are the intensive light mirror surfaces of the background surfaces and the dark, light absorbing pattern elements.

12. A stamping film according to claim 9, wherein the relief structures of the second partial surfaces are a cross-grating composed of two base gratings arranged in mutually right-angled relationship, wherein the periods of the base gratings are shorter than a predetermined limit wavelength of the visible light.

13. A stamping film according to claim 9, wherein the effective structural depth of the relief structure of the second partial surfaces is of a value between 50 nm and 500 nm.

14. A stamping film according to claim 13 wherein the pattern has regions with various gray stages which differ by the optically effective structural depth.

15. A stamping film according to claim 1 wherein the optically variable layer is a thin-film element for producing a color change by interference.

16. A stamping film according to claim 15 wherein the optically variable layer has an absorption layer and a spacer layer.

17. A stamping film according to claim 15 wherein the thin-film element has a number of thin layers with different refractive indexes.

18. A stamping film according to claim 1 wherein the optically variable layer has at least one polarization layer.

19. A stamping film according to claim 1 wherein the reflection layer is a metal thin layer.

20. A stamping film according to claim 1 wherein the reflection layer is formed by at least one dielectric layer comprising an inorganic dielectric.

21. A stamping film according to claim 1 wherein at least one of the release layer, the decoration layer, the protection layer and the colored layer contains at least one of a UV absorber and a HALS stabilizer additive for improving UV resistance.

22. A stamping film according to claim 1 wherein at least one of the decoration layer and the colored layer contains amorphous carbon.

23. A tamper-proof motor vehicle license plate comprising:
a transfer layer from a stamping film; and
a substrate of a motor vehicle license plate, wherein the transfer layer is fixed on the substrate, the transfer layer including, in successive order, a transparent release layer, an opaque decoration layer, a transparent protection layer, an optically variable layer, a reflection layer and an adhesive layer, wherein the decoration layer has mutually spaced areal interruptions where the transparent protection layer adjoins the release layer and wherein the adhesive layer secures the transfer layer to the substrate of the motor vehicle license plate, the optically variable layer being visible through the areal interruption from the transparent release layer side of the transfer layer.

24. A tamper-proof motor vehicle license plate according to claim 23 wherein the areal interruptions of the decoration layer have a peripheral edge of a graphic configuration.

25. A tamper-proof motor vehicle license plate according to claim 24 wherein the areal interruptions of the decoration layer are of small area dimensions which occupy a proportion of surface area of less than 20%.

26. A tamper-proof motor vehicle license plate according to claim 23 wherein a colored layer is arranged between the reflection layer and the adhesive layer.

27. A tamper-proof motor vehicle license plate according to claim 23 wherein at least one of the release layer, the decoration layer, the protection layer and the colored layer contains at least one of a UV absorber and an HALS stabilizer additives for improving UV resistance.

28. A tamper-proof motor vehicle license plate according to claim 23 wherein at least one of the decoration layer and the colored layer contains amorphous carbon.

29. A stamping film for producing tamper-proof motor vehicle license plates, comprising:
  a carrier film; and
  a transfer layer removeably secured to the carrier film for fixing to a substrate of the motor vehicle license plate, the transfer layer including a transparent release layer, an opaque decoration layer, a transparent protection layer, an optically variable layer, a reflection layer and an adhesive layer, wherein the opaque decoration layer includes areal interruptions at a location where the transparent protection layer joins the release layer, wherein the adhesive layer secures the transfer layer to the substrate of the motor vehicle license plate when fixed thereon, wherein the optically variable layer includes an asymmetrical macrostructure that reflects incident light directed in one or more directions from specular reflection.

* * * * *

UNITED STATES PATENT AND TRADEMARK OFFICE
CERTIFICATE OF CORRECTION

PATENT NO. : 8,158,252 B2  
APPLICATION NO. : 10/599678  
DATED : April 17, 2012  
INVENTOR(S) : Sussner et al.

Page 1 of 1

It is certified that error appears in the above-identified patent and that said Letters Patent is hereby corrected as shown below:

IN THE SPECIFICATION:

Column 1, line 9,
   now reads "DE20057000551 filed on"
   should read -- DE20051000551 filed on --

Column 3, line 11,
   now reads "invention the a real interruptions"
   should read -- invention the areal interruptions --

Column 5, line 28,
   now reads "very good recognizably of the"
   should read -- very good recognizability of the --

Column 7, line 18,
   now reads "areal interruptions 38 when the"
   should read -- areal interruptions 36 when the --

Column 7, line 49,
   now reads "after drying of 1.15 µm;"
   should read -- after drying of 1.15 µm: --

Column 9, line 32,
   now reads "replication lacquer layer;"
   should read -- replication lacquer layer: --

Signed and Sealed this
Nineteenth Day of March, 2013

Teresa Stanek Rea
*Acting Director of the United States Patent and Trademark Office*